US009360344B2

(12) United States Patent
Grossmann et al.

(10) Patent No.: US 9,360,344 B2
(45) Date of Patent: Jun. 7, 2016

(54) PARALLEL READING OF AN ANALOG SENSOR BY TWO CONTROL UNITS

(71) Applicant: Robert Bosch GmbH, Stuttgart (DE)

(72) Inventors: Alex Grossmann, Leonberg (DE); Udo Sieber, Bietigheim (DE); Daniel Henning, Sersheim (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/427,806

(22) PCT Filed: Sep. 17, 2013

(86) PCT No.: PCT/EP2013/069260
§ 371 (c)(1),
(2) Date: Mar. 12, 2015

(87) PCT Pub. No.: WO2014/056683
PCT Pub. Date: Apr. 17, 2014

(65) Prior Publication Data
US 2015/0253152 A1 Sep. 10, 2015

(30) Foreign Application Priority Data
Oct. 8, 2012 (DE) .......................... 10 2012 218 274

(51) Int. Cl.
*G06F 7/00* (2006.01)
*G01D 3/028* (2006.01)
*G01D 3/00* (2006.01)
*G01D 21/00* (2006.01)
*B60K 26/02* (2006.01)

(52) U.S. Cl.
CPC .................. *G01D 3/028* (2013.01); *G01D 3/00* (2013.01); *G01D 21/00* (2013.01); *B60K 2026/023* (2013.01); *B60W 2540/10* (2013.01)

(58) Field of Classification Search
None
See application file for complete search history.

(56) References Cited

U.S. PATENT DOCUMENTS

| | | | | |
|---|---|---|---|---|
| 6,091,201 A * | 7/2000 | Walsh | .................. | H05B 39/042 315/169.1 |
| 2008/0296106 A1* | 12/2008 | Nilsson | .................. | B60T 8/321 188/156 |
| 2011/0246047 A1* | 10/2011 | Smith | ..................... | F02D 41/22 701/103 |
| 2012/0143441 A1 | 6/2012 | Yamazaki et al. | | |
| 2012/0293009 A1* | 11/2012 | Kim | ....................... | H02H 7/152 307/104 |

FOREIGN PATENT DOCUMENTS

DE 40 27 031 A1 3/1992

OTHER PUBLICATIONS

International Search Report corresponding to PCT Application No. PCT/EP2013/069260, mailed Dec. 17, 2013 (German and English language document) (5 pages).

* cited by examiner

*Primary Examiner* — Adam Alharbi
(74) *Attorney, Agent, or Firm* — Maginot, Moore & Beck LLP

(57) ABSTRACT

An arrangement for reading a sensor element in a vehicle includes a sensor element. The sensor element has at least one analog signal output. The arrangement further includes a first control unit. The first control unit has at least one first signal input. The arrangement further includes a second control unit. The second control unit has at least one second signal input. The signal output is connected to the at least one first signal input. The signal output is further connected to the at least one second signal input using a voltage divider.

8 Claims, 2 Drawing Sheets

PARALLEL READING OF AN ANALOG SENSOR BY TWO CONTROL UNITS

This application is a 35 U.S.C. §371 National Stage Application of PCT/EP2013/069260, filed on Sep. 17, 2013, which claims the benefit of priority to Serial No. DE 10 2012 218 274.8, filed on Oct. 8, 2012 in Germany, the disclosures of which are incorporated herein by reference in their entirety.

The present disclosure relates to sensor engineering in vehicles. In particular, the present disclosure relates to parallel reading of an analog sensor by two control units and hence to the parallel forwarding of the sensor signal to both control units. More particularly, the present disclosure relates to an arrangement for reading a sensor element in a vehicle and to a vehicle, particularly an automobile, more particularly an electric or hybrid vehicle, having an arrangement according to the disclosure.

BACKGROUND

Sensors in vehicles pick up analog and digital measured values and forward them to further electronic components or controllers in the vehicle using suitable means. Said electronic components or controllers use the measurement data in order to influence the vehicle behavior and particularly to safeguard operation of the vehicle.

In some applications in the vehicle, a situation may arise in which an identical measured variable, hence a measured variable from a particular sensor, is needed not just by one but rather by a plurality of, for example two or three, different control units. These control units may be positioned at different locations in the vehicle, in particular, so that often it is not possible to firmly couple the ground connection of the plurality of control units sufficiently well. This means that it is often not simply possible to branch an analog sensor signal and forward it to the plurality of control units, since a ground offset between the control units could result in a possibly significant measurement error. The ground offset may at least mean that the measured values of the sensor signal differ.

Conventionally, an identical measured variable is split over a plurality of control units such that, as one alternative, a second sensor is provided for the same measured variable and is then read by a second controller or a second control unit directly. Alternatively, the measured value ascertained by one control unit can be forwarded to further control units using suitable communication interfaces. While the installation of a second sensor entails sometimes substantial additional costs and may also be able to be implemented only with difficulty on account of spatial circumstances, transmission of the measured value via a data bus usually brings about a not negligible signal delay on account of the transmission time required. Such a signal delay may—if a measured variable is used directly in a control loop—often be unacceptable.

SUMMARY

One aspect of the present disclosure may therefore be considered that of performing transmission of a measurement signal to a plurality of control units in parallel that is less expensive and/or better suited to realtime applications than conventional implementations.

Accordingly, an arrangement for reading a sensor element in a vehicle and also a vehicle, particularly an automobile, more particularly an electric or hybrid vehicle, having an arrangement according to the disclosure and as claimed in the independent patent claims are indicated. Preferred embodiments arise from the dependent claims.

According to the disclosure, a sensor element is used that is first of all connected, in an essentially conventional manner, to a first control unit that evaluates the relevant measurement signal or ascertains the relevant measured value and conditions or forwards it for further use in the vehicle. Such a connection may essentially consist of a direct conductive connection between the sensor element and the control unit.

By way of example, a sensor element has a signal output and two power supply connections, for example designed for positive voltage and ground. A control unit may now have essentially comparable connections, particularly a shared ground connection with the sensor element, and provide a positive supply voltage for the sensor element, e.g. in the event of the latter being an active sensor element. The output measurement signal can be digitized in the control unit, particularly using an analog/digital converter.

Furthermore, a second control unit may be provided that is possibly arranged at a different location in the vehicle, however, in particular at a significant interval from the first control unit. This different arrangement location may now mean that a ground offset arises between the ground connections of the first control unit and the second control unit. Such a ground offset may be a non-identical ground potential, in particular a voltage difference may arise between the ground connections of the first control unit and the second control unit.

If the measurement signal were now to be tapped off by the second control unit in comparable fashion to the first control unit, there would be the possibility that the individual control units ascertain from the sensor signal a different measured value, particularly on account of the ground offset, as a result of which the individual control units would set out from different circumstances on the basis of the measured value in the vehicle and actuate different or possibly even catastrophically inconsistent operating states for individual vehicle components.

The signal output of the sensor element can be transmitted to the second control unit, and, in particular, reference ground and/or power supply from the sensor element may also be forwarded to the second control unit. Since these voltages may possibly be below the reference ground of the second control unit or may exceed a reference voltage of an analog/digital converter of the second control unit, the disclosure provides at least one voltage divider in order to read the signal from the sensor element into the second control unit.

The signal output of the sensor element, the supply voltage and the ground connection may be connected to the respective connections of the second control unit via suitable series resistors. These connections can be transmitted particularly to the analog/digital converter of the second control unit. The second control unit can in turn provide a power supply and a ground connection, between which connections a voltage divider is arranged that has, as a center point between two voltage-dividing resistors, at least the output signal from the sensor element or else the supply voltage and ground connection thereof.

Provided between the two control units there may be a data bus link, for example a CAN bus link, in order to transmit information from the first control unit to the second control unit, particularly information regarding the sensor measured value, which information may be used to compensate for tolerances in the voltage dividers of the second control unit by means of a consistency check. In this case, the direct reading of the analog value from a sensor element by the second control unit can be effected substantially more quickly than in the case of the first control unit, while a consistency check via a data bus link between the control units can also be effected more slowly, in particular substantially more slowly. Delay times on account of digitization and/or conditioning of the measured value before the information is forwarded to the second control unit by the first control unit for the consistency check may be substantially uncritical.

Depending on the required accuracy, it is possible, particularly if a consistency check takes place between the control units, to dispense with the transmission of the supply voltage and also the ground signal and, by way of example, to transmit only the ground and signal outputs of the sensor element, the supply output and the signal output or else just the signal output to the second control unit.

BRIEF DESCRIPTION OF THE DRAWINGS

Embodiments of the disclosure are shown in the drawings and explained in more detail in the description that follows.

In the drawings.

DETAILED DESCRIPTION

Figure 1:
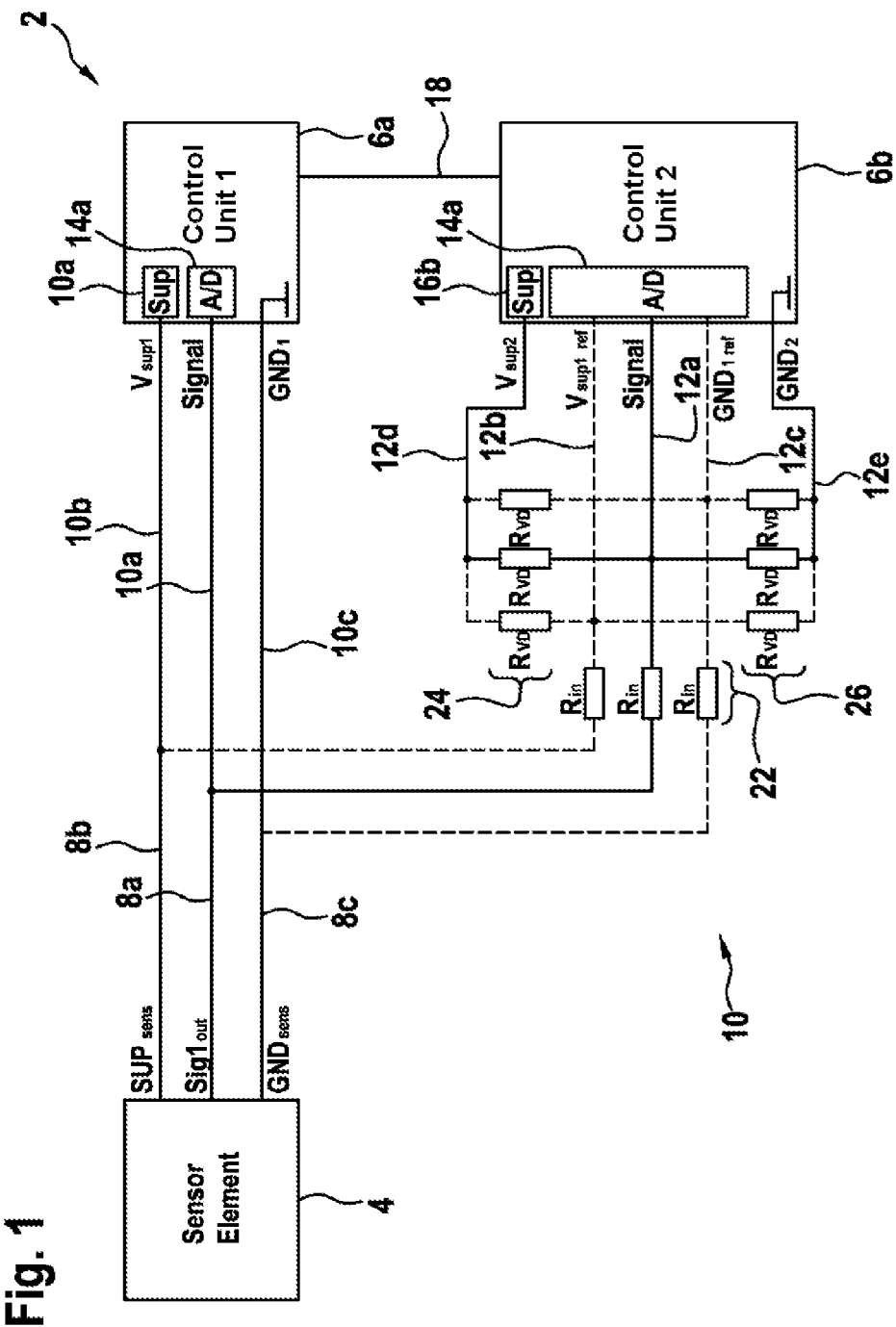
FIG. 1 shows an exemplary embodiment of a circuit diagram for an arrangement for reading a sensor element according to the present disclosure.

With further reference to FIG. 1, an exemplary embodiment of a circuit diagram for an arrangement for reading a sensor element according to the present disclosure is shown.

FIG. 1 shows an arrangement 2 with a sensor element 4 and two control units 6a, b. By way of example, the sensor element 4 has three connections, a signal output 8a, a supply voltage connection 8b and a ground connection 8c. Controller 1 6a has comparable connections 10a, b, c. In FIG. 1, the connections are directly connected between the sensor element 4 and the control unit 6a by way of example. Controller 1 6a has a digital/analog converter 14 for digitizing the sensor signal 8a and a power supply 16 that can be used to operate the sensor element 4, for example, as an active sensor. Further processing steps for the signal 8c in the control unit 6a are not shown in more detail in FIG. 1. The control unit 6a has a connection to a data link 18 that may be used to distribute a piece of information regarding the sensor measured value in a suitable fashion in the vehicle, inter alia.

Provided in parallel with the control unit 1 6a is control unit 2 6b. The control unit 2 6b tops off at least the signal connection 8a from the sensor element 4 and forwards said signal connection to an analog/digital converter 14b of the control unit 2 6b using a series resistor 22. To this end, the control unit 2 6b has a connection 12a. In the suitable analog/digital converter 14b, it is equally possible, likewise via suitable series resistors 22, for the connections 8b, c of the sensor element 4 to be connected to comparable connections 12b, c of the control unit 2 6b.

By way of example, the control unit 2 6b has a power supply 16b and a ground connection 12e, between which connections a voltage divider is set up using the resistors 24, 26. In this case, the voltage divider is formed together with the respective input resistor 22.

In particular, only the signal 8a may be connected to the corresponding input 12a of the analog/digital converter 14b of the control unit 2 6b using the voltage divider formed from the resistors 22, 24, 26. Alternatively, it is additionally possible for the connections 8b and/or 8c to be connected to the further inputs 12b, c of the analog/digital converter 14b using comparable voltage dividers. The resistors 22, 24 and 26 are shown as having the same value in FIG. 1 by way of example.

The precise interpretation and hence the values of the resistors are due to a specific embodiment, however, and accordingly variable within the context of said embodiment.

One possible interpretation is resistor 22 $R_{IN}$ at approximately 10 kΩ and resistors 24, 26 $R_{VD}$ at approximately 100 kΩ each. This results in just relatively weak coupling of the control units 6a, b to one another. In this case, the signal 8a is evaluated in the control unit 2 6b on the basis of the following formula:

$$\frac{V_{signal} - GND_{1_{ref}}}{V_{sup1\_ref} - GND_{1_{ref}}}$$

and results in a signal value as a percentage of the original voltage of $V_{SUP1}$. A comparison with the directly measured signal value from the control unit 1 6a, which information can be transmitted via the data link 18 allows a comparatively slow consistency check and furthermore provides a way of adapting out an error in the voltage dividers.

Figure 2:
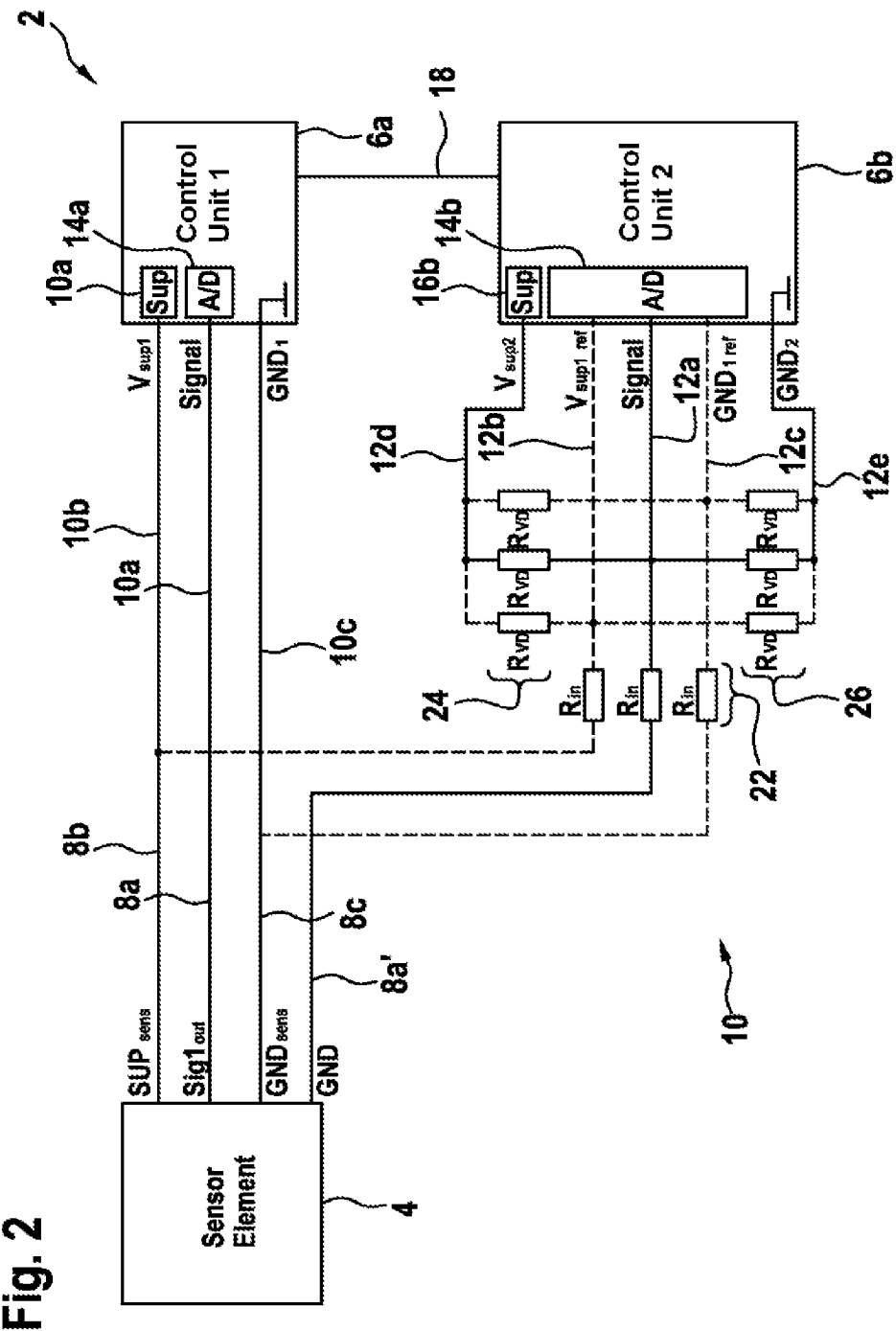
FIG. 2 shows a further embodiment of a circuit diagram for an arrangement for reading a sensor element according to the present disclosure.

With further reference to FIG. 2, a further embodiment of a circuit diagram for an arrangement for reading a sensor element according to the present disclosure is shown.

FIG. 2 differs from FIG. 1 only in that the sensor element 4 already has a parallel signal output 8a, and hence has a plurality of signal outputs 8a, a' that output the same signal. In this case, the arrangement 2 according to the disclosure allows the connection of the second control unit 6b using the connection 8a'. Since, again, tapping off the connections 8b, c of the sensor element 4 to the control unit 2 6b is optional, it may suffice for just one line to be laid from the connection 8a' to the control unit 2 6b in the vehicle.

One specific use for the arrangement according to the disclosure is use for an active accelerator pedal. In this case, the information about the pedal position may be used either in a central motor controller or in local actuating electronics in the active accelerator pedal in situ, for example for a force feedback application.

The invention claimed is:

1. An arrangement for reading a sensor element in a vehicle, comprising:
    a sensor element including an analog signal output;
    a first control unit including a first signal input configured to measure an input signal relative to a first ground reference, the analog signal output being connected to the first signal input;
    a second control unit including a second signal input configured to measure the input signal relative to a second ground reference, the first ground reference being at a first voltage offset that is different than a second voltage offset of the second ground reference; and
    a voltage divider configured to generate a signal at a predetermined division factor corresponding to a signal from the analog signal output, the voltage divider comprising:
        a first input connected to the analog signal output; and
        a first output connected to the first input of the first control unit and connected to the second signal input of the second control unit.

2. The arrangement as claimed in claim 1, wherein the at least one analog signal output is connected to the at least one first signal input directly.

3. The arrangement of claim 1 further comprising:
    a data bus connected to the first control unit and the second control unit; and the first control unit and the second control unit being configured to transmit detected signal levels received from the sensor element using the data bus to reduce or eliminate measurement errors of the signal from the sensor element between the first controller and the second controller.

4. The arrangement as claimed in claim 1,
wherein the first control unit is arranged comparatively close to the sensor element and the second control unit is arranged comparatively far from the sensor element.

5. The arrangement as claimed in claim 1,
wherein the sensor element is configured as a pedal sensor and the first control unit is arranged on the pedal sensor and the second control unit is in the form of a motor controller.

6. A vehicle comprising:
an arrangement, the arrangement including:
   a sensor element including an analog signal output;
   a first control unit including a first signal input configured to measure an input signal relative to a first ground reference, the analog signal output being connected to the first signal input;
   a second control unit including a second signal input configured to measure the input signal relative to a second ground reference, the first ground reference being at a first voltage offset that is different than a second voltage offset of the second ground reference; and
   a voltage divider configured to generate a signal at a predetermined division factor corresponding to a signal from the analog signal output, the voltage divider comprising:
      a first input connected to the analog signal output; and
      a first output connected to the first input of the first control unit and connected to the second signal input of the second control unit.

7. The arrangement of claim 1, the voltage divider further comprising:
   a second input connected to the first ground of the first control unit; and
   a second output connected to a ground reference input of the second control unit.

8. The arrangement of claim 7 further comprising:
   a power supply output in the sensor;
   a first power supply reference input in the first control unit;
   a second power supply reference input in the second control unit; and
   the voltage divider further comprising:
      a third input connected to the power supply output in the sensor; and
      a third output connected to a power supply reference input of the second control unit.

* * * * *